United States Patent
Huang et al.

(10) Patent No.: US 7,836,221 B2
(45) Date of Patent: Nov. 16, 2010

(54) DIRECT MEMORY ACCESS SYSTEM AND METHOD

(75) Inventors: Yin-Hsi Huang, Hsin Chu County (TW); Chun-Jieh Huang, Chang Hua (TW)

(73) Assignee: SONIX Technology Co., Ltd., Hsinchu (TW)

( * ) Notice: Subject to any disclaimer, the term of this patent is extended or adjusted under 35 U.S.C. 154(b) by 280 days.

(21) Appl. No.: 12/049,156

(22) Filed: Mar. 14, 2008

(65) Prior Publication Data

US 2009/0125648 A1   May 14, 2009

(30) Foreign Application Priority Data

Nov. 14, 2007   (TW) ............... 96142946 A

(51) Int. Cl.
   *G06F 13/28* (2006.01)
(52) U.S. Cl. ....................................... 710/22
(58) Field of Classification Search ............ 710/22
   See application file for complete search history.

(56) References Cited

U.S. PATENT DOCUMENTS

| | | | | |
|---|---|---|---|---|
| 5,353,284 A * | 10/1994 | Shiobara | ...................... | 370/463 |
| 5,893,141 A * | 4/1999 | Kulkarni | ...................... | 711/118 |
| 6,230,219 B1 * | 5/2001 | Fields et al. | ................... | 710/22 |
| 6,763,029 B2 * | 7/2004 | Trevitt et al. | ................. | 370/412 |
| 2005/0114742 A1 * | 5/2005 | Takenobu | ..................... | 714/56 |
| 2005/0216612 A1 * | 9/2005 | Usui | .......................... | 710/22 |

\* cited by examiner

*Primary Examiner*—Henry W Tsai
*Assistant Examiner*—Kris Rhu
(74) *Attorney, Agent, or Firm*—Muncy, Geissler, Olds & Lowe, PLLC

(57) ABSTRACT

A DMA system includes at lease one read bus, at least one write bus, at least one buffer memory bus, and a DMA controller. The DMA controller comprises a plurality of channels and a bus arbiter. The channels are electrically connected to the read bus, the write bus, and the buffer memory bus. A source address and a destination address of data for each channel are assigned by a control table. The bus arbiter performs bus arbitration and prioritizes data access among the read bus, the write bus, and the buffer memory bus.

20 Claims, 5 Drawing Sheets control table for DMA controller

| channel | status | source address | destination address | data length | transfer state | content |
|---|---|---|---|---|---|---|
| A1 | Enable | Read_port_1 | Memory_Address | Length | Stage | Data |
| A2 | Enable | Read_port_2 | Memory_Address | Length | Stage | Data |
| B1 | Enable | Memory_Address | Write_port_1 | Length | Stage | Data |
| B2 | Enable | Memory_Address | Write_port_2 | Length | Stage | Data |
| C1 | Enable | Read_port_3 | Write_port_3 | Length | Stage | Data |
| C2 | Enable | Read_port_4 | Write_port_4 | Length | Stage | Data |
| A3 | Disable | Read_port_# | Memory_Address | Length | Stage | Data |
| B3 | Disable | Memory_Address | Write_port_# | Length | Stage | Data |
| C3 | Disable | Read_port_# | Write_port_# | Length | Stage | Data |

FIG. 4

DIRECT MEMORY ACCESS SYSTEM AND METHOD

CROSS REFERENCE TO RELATED APPLICATION

This application claims priority of application No. 096142946 filed in Taiwan R.O.C on Nov. 14, 2007 under 35 U.S.C. §119; the entire contents of which are hereby incorporated by reference.

BACKGROUND OF THE INVENTION

1. Field of the Invention

The invention relates to a direct memory access (DMA) system and method, particularly to a DMA system and a DMA method having improved transmission efficiency and high expandability.

2. Description of the Related Art

Direct memory access (DMA) allows direct data transfer between a peripheral device and a memory without the participation of a processor like CPU. The large amount of data transfer between the peripheral device and the memory by way of direct memory access (DMA) does not need any interrupt service from an interrupt service routine and is completed via hardware. Therefore, it would save much time for a processor to execute programs.

As shown in FIG. 1, a DMA controller 11 is considered as a controller that can connect the internal and external memories with the peripheral devices 21, 22, 23, and 24 having DMA capability together via a set of special-purpose buses 12. As data transmission is initialized, after a device driver sets the addresses and counting registers of DMA channels and the direction of data transmission, the DMA hardware is instructed to start the transmission operation. As the transmission operation is finished, the device will notify the CPU 13 by issuing an interrupt. In other words, a conventional DMA operation includes reading and writing operations. Since the bus 12 allows only one of the peripheral devices 21, 22, 23, and 24 to access data during the same period of time, the transmission efficiency of the whole DMA system is lowered in case the data are not ready or the peripheral devices are busy.

Another DMA configuration is shown in FIG. 2 where the peripheral devices 21, 22, 23, and 24 are connected to the DMA controller 11' via their respective buses 12 to promote the transmission efficiency of the whole DMA system. However, according to the DMA configuration shown in FIG. 2, during data transmission, it is difficult for the peripheral devices 21, 22, 23, and 24 to share the same buffer memory for temporary storage. Thus, in the hardware design for such configuration, buffer memories must be provided for the peripheral devices 21, 22, 23, and 24 individually to occupy considerable chip areas. In addition, such DMA configuration may result in low re-utilization of circuits to increase the number of buses as long as the space of buffer memories when more peripheral devices are incorporated therein. Under the circumstance, it becomes even more difficult to modify the hardware design.

BRIEF SUMMARY OF THE INVENTION

In light of the above-mentioned problem, one object of the invention is to provide a direct memory access (DMA) system and a DMA method that can improve the transmission efficiency and maintain high expandability for the buses and channels of the DMA system.

According to an aspect of the invention, a DMA system includes at lease one read bus, at least one write bus, at least one buffer memory bus, and a direct memory access controller. The read bus has at least a first read port for reading data from a first peripheral device. The write bus has at least a first write port for writing data into a second peripheral device. The buffer memory bus has at least a second read port and at least a second write port for accessing a buffer memory. The direct memory access controller includes a plurality of channels and a bus arbiter. The channels are electrically connected to the read bus, the write bus, and the buffer memory bus. Besides, a source address and a destination address of data for each channel are assigned by a control table. The bus arbiter performs bus arbitration and prioritizes data access among the read bus, the write bus, and the buffer memory bus.

According to another aspect of the invention, a direct memory access (DMA) method used for a DMA system is provided. The DMA method includes the steps of: utilizing a control table to assign a source address and a destination address of data for each of a plurality of channels of the DMA system, the channels being electrically connected to the read bus, the write bus, and the buffer memory bus; and transferring data by the DMA system according to the source address and the destination address of data for each channel. The read bus, the write bus, and the buffer memory bus are allowed to be accessed simultaneously in one period of time.

According to the DMA system and the DMA method described in the embodiments of the invention, since the read bus, the write bus, and the buffer memory bus are shared by a plurality of peripheral devices, the transmission efficiency is improved and the number of buses can be reduced. Besides, when the bandwidth is required to be increased, the DMA architecture of the invention makes it easy to add more buses thereto and simplifies the connection between peripheral devices and buses. Moreover, the design of transmitting channels is more flexible and has high expandability. Further, under the DMA configuration according to the invention, the buffer memory can be shared by different peripheral devices for temporary storage to thus save memory space and chip areas as a result. Therefore, the allocation of memory space can be centralized to promote the utilization of memories.

BRIEF DESCRIPTION OF THE DRAWINGS

FIG. 4 shows an embodiment of a control table that defines channels A1-C2.

DETAILED DESCRIPTION OF THE INVENTION

Figure 1:
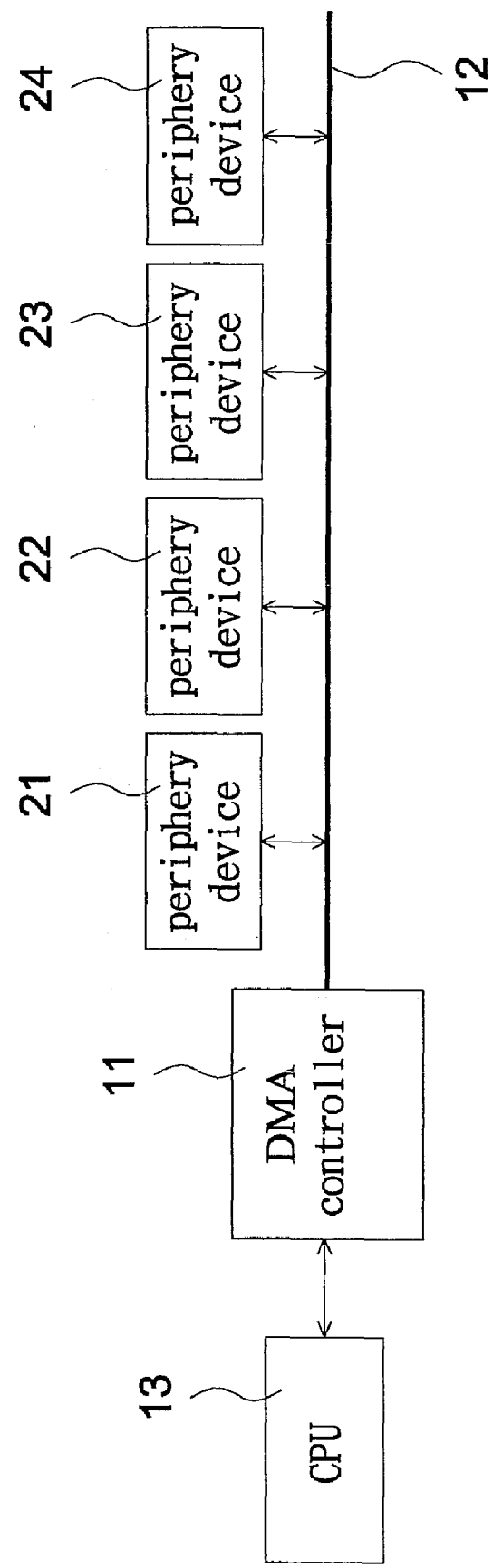
FIG. 1 shows a block diagram illustrating a conventional direct memory access system.
Figure 2:
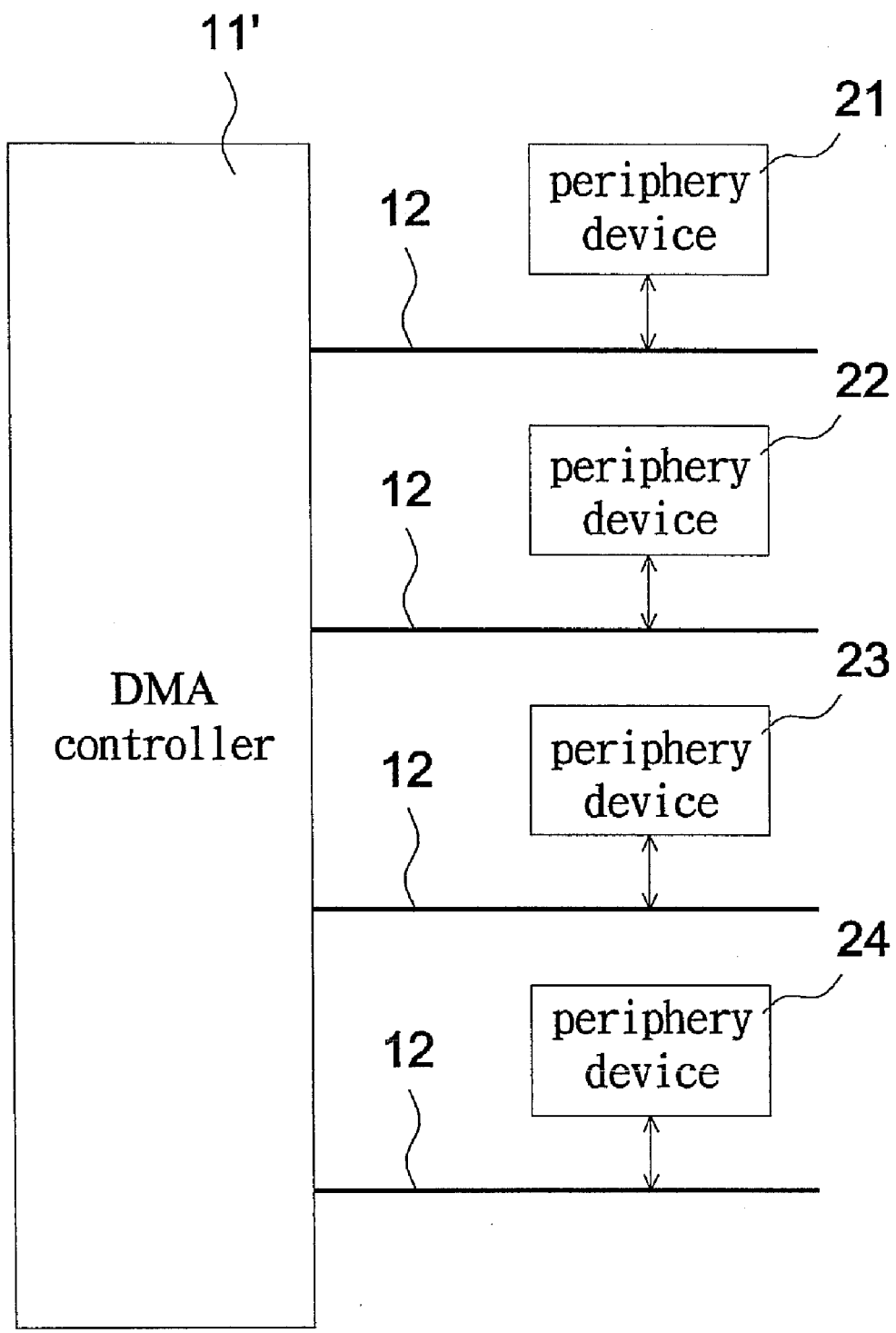
FIG. 2 shows a block diagram illustrating another conventional direct memory access system.
Figure 3:
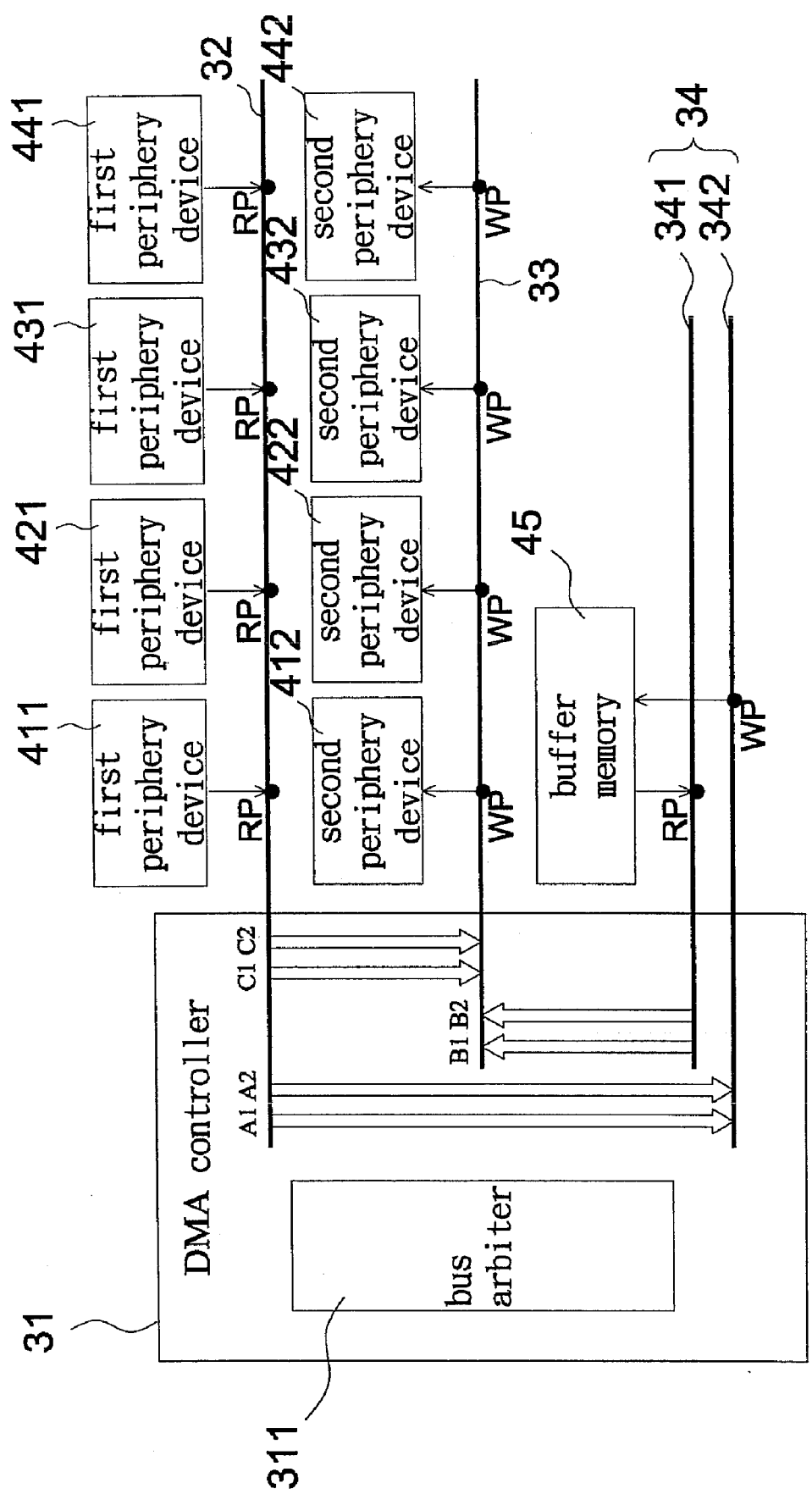
FIG. 3 shows a block diagram illustrating a direct memory access system according to an embodiment of the invention.

Referring to FIG. 3, one direct memory access system, according to an embodiment of the invention, includes at lease one read bus 32, at least one write bus 33, at least one buffer memory bus 34, and a direct memory access (DMA) controller 31. As shown in FIG. 3, the read bus 32 is electrically connected to first peripheral devices 411, 421, 431, and 441 for reading data from the first peripheral devices 411, 421, 431, and 441. The read bus 32 has at least one read port RP, preferably a plurality of read ports RP. The write bus 33 is electrically connected to the second peripheral devices 412, 422, 432, and 442 for writing data to the second peripheral devices 412, 422, 432, and 442. The write bus 33 has at least one write port WP, preferably a plurality of write ports WP.

It should be noted that the first peripheral device and the second peripheral device can be the same. For example, the first peripheral device 411 and the second peripheral device 412 are the same peripheral device.

The read bus 32 reads data from a peripheral device, while the write bus 33 writes data into a peripheral device. The buffer memory bus 34 is a two-way transmission bus, i.e. it has at least one read port RP and at least one write port WP. Preferably, the buffer memory bus 34 has a plurality of read ports RP and a plurality of write ports WP. The buffer memory 45, such as a static random access memory (SRAM), is connected to the buffer memory bus 34 and can be accessed via the buffer memory bus 34. As shown in FIG. 3, the two-way transmission buffer memory bus 34 can be implemented by a memory read bus 341 and a memory write bus 342. That is, the memory read bus 341 has a read port RP for reading data from the buffer memory 45, and the memory write bus 342 has a write port WP for writing data into the buffer memory 45.

The direct memory access (DMA) controller 31 includes a plurality of channels and a bus arbiter 311 that performs bus arbitration and prioritizes data access among the read bus 32, the write bus 33, and the buffer memory bus 34. For example, the bus arbiter 311 may be a daisy-chain arbiter or a parallel arbiter. Further, the arbiter state machine used to prioritize bus data access is implemented by way of round robin scheduling; in that case, when the data are not ready or the peripheral device is busy, a next data transmission routine is scheduled to access the bus so as to promote the utilization rate of the bus.

In the embodiment shown in FIG. 3, the DMA controller 31 has six channels A1, A2, B1, B2, C1, and C2 that are electrically connected to the read bus 32, the write bus 33, and the buffer memory bus 34, respectively. The DMA controller 31 utilizes a control table to assign the source and the destination addresses of data to the channels A1-C2. As shown in FIG. 3, the channels A1 and A2 are electrically connected to the read bus 32 and the memory write bus 342 of the buffer memory bus 34. The channels A1 and A2 are used to read data from the peripheral devices connected to the read bus 32 and to write data into the buffer memory 45. The channels B1 and B2 are electrically connected to the memory read bus 341 of the buffer memory bus 34 and the write bus 33. The channels B1 and B2 are used to read data from the buffer memory 45 and to write data into the peripheral devices connected to the write bus 33. The channels C1 and C2 are electrically connected to the read bus 32 and the write bus 33. The channels C1 and C2 are used to read data from the peripheral devices connected to the read bus 32 and to write data into the peripheral devices connected to the write bus 33.

FIG. 4 shows an embodiment of a control table that defines channels A1-C2. Referring to FIG. 4, Read_port_1 to Read_port_4 represent the four read ports of the read bus 32, which are connected to the first peripheral devices 411-441, respectively. Similarly, Write_port_1 to Write_port_4 represent the four write ports of the write bus 33, which are connected to the second peripheral devices 412-442, respectively. Also, Memory_address represents pre-determined addresses in the buffer memory 45.

The control table at least records the source and the destination addresses of transmitted data for each channel. For example, the source address of transmitted data for the channel A1 is Read_port_1 while the destination address is Memory_address. Therefore, when the channel A1 is used to execute DMA for transferring data, the data from the first peripheral device 411 can be read out and then written into pre-determined addresses in the buffer memory 45. Similarly, when the channel B1 is used to execute DMA for transferring data, the data from the buffer memory 45 can be read out and then written into the second peripheral device 412. Also, when the channel C1 is used to execute DMA for transferring data, the data from the first peripheral device 431 can be read out and then written into the second peripheral device 432. It should be noted that reading and writing operations of data access are separately completed by different buses for each DMA transaction. Therefore, when the read bus 32 is reading data, the write bus 34 or the buffer memory bus 34 can execute a writing operation at the same time.

As shown in FIG. 4, except the source and the destination addresses of transmitted data, the control table records some information for each channel like the enablement status, data length, data transfer state, etc. In one embodiment, the control table is implemented by a register, and, in that case, the control table is capable of temporarily storing the transmitted data for each channel. The implementation of the control table includes, but is not limited to, hardware, firmware, software, or a combination of at least two of them.

Figure 5:
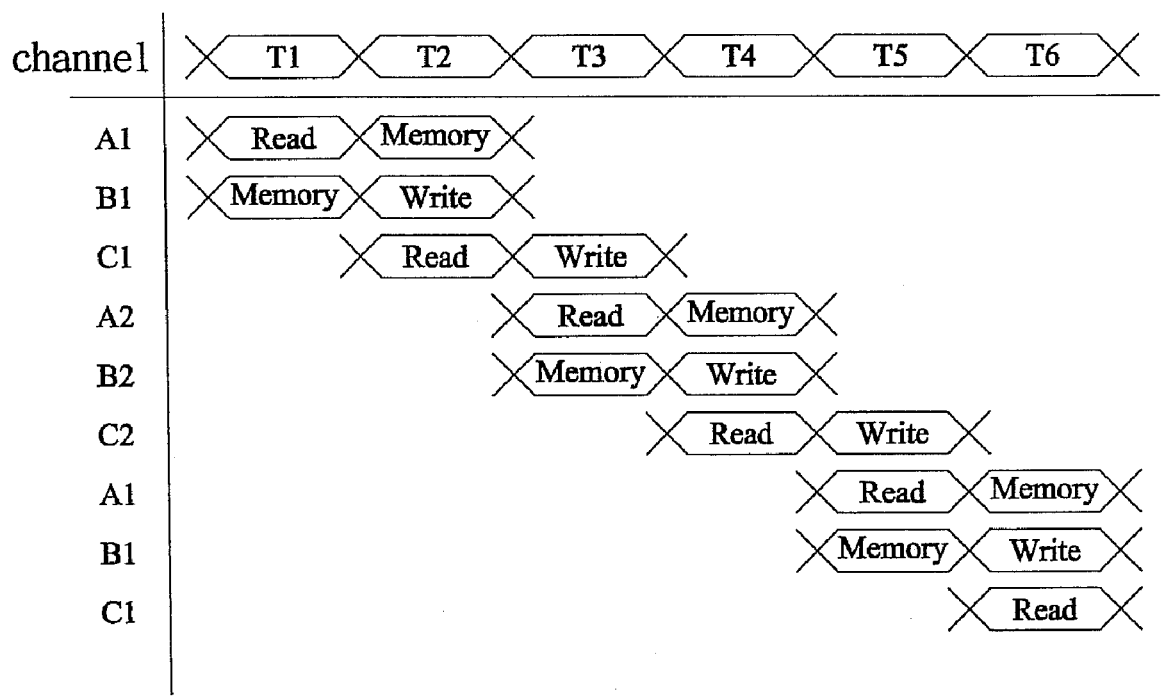
FIG. 5 shows a timing diagram illustrating the data transfer process of a DMA system according to an embodiment of the invention.

FIG. 5 shows a timing diagram illustrating the data transfer process of a DMA system according to an embodiment of the invention. In FIG. 5, T1-T6 represent periods of time, "Read" represents data access using the read bus 32, "Write" represents data access using the write bus 33, and "Memory" represents data access using the buffer memory bus 34. As shown in FIG. 5, the channel A1 executes a reading operation during the period T1 and executes a writing operation during the period T2 to complete one DMA transaction. Since the buffer memory bus 34 is not used during the period T1, the channel B1 can read the data from the buffer memory 45 during the period T1 and write data into the second peripheral device 412 through the write bus 33 during the period T2 to complete another DMA transaction. As previously described, since the channels A1 and B1 use the buffer memory bus 34 at different time periods to avoid conflicts of data access, the channels A1 and B1 both finish their respect DMA transactions during the same time (period T1 and period T2) to achieve the purpose of time-sharing.

Next, during the period T2, the read bus 32 is idle and thus the channel C1 can use the read bus 32 to read data from the first peripheral device 431, and, during the period T3, the channel C1 can use the write bus 33 to write data into the second peripheral device 432 to complete one DMA transaction. Similarly, the channels A2, B2, and C2 sequentially using buses to complete their respective DMA transactions. Since the read bus 32 and the write bus 33 are accessed by different channels during the periods T1-T6 to execute individual transactions, the read bus 32 and the write bus are shared by different peripheral devices to achieve the purpose of space-sharing that results in high re-utilization of circuits. Also, the buffer memory 45 connected to the buffer memory bus 34 can be shared by different peripheral devices to save memory space and chip areas as a result.

Note that the read bus 32, the write bus 33, and the buffer memory bus 34 can be all accessed by the periphery devices within the same time period. For example, during the period T3, the write bus 33 is used by the channel C1, the read bus 32 is used by the channel A2, and the buffer memory bus 34 is used by the channel B2. During the period T4, the write bus 33 is used by the channel B2, the read bus 32 is used by the channel C2, and the buffer memory bus 34 is used by the channel A2. Therefore, the reading and writing operations for one DMA transaction can be executed by different buses to overcome the problem that the data are unready to be transmitted or the peripheral devices are too busy to access the bus. Thus, the purposes of time-sharing and space-sharing are achieved to highly promote the transmission efficiency of the whole DMA system.

Further, the number of channels, such as six channels A1-C2 shown in FIG. 3, is not limited according to the invention. The DMA system may reserve some channels by means of hardware design. For example, the reserved channels A3, B3, and C3 shown in FIG. 4 are first set to be "disable", and, once the channels A3, B3, and C3 are needed, the status of them is changed from "disable" to "enable" to allow for executing DMA transactions.

Besides, the data buses of a DMA system include, but is not limited to, the read bus 32, the write bus 33, and the buffer memory bus 34 shown in FIG. 3. For example, an additional internal memory bus having at least one read port and write port may be integrated in the DMA system, and the channels are electrically connected to the internal memory bus. When the source and the destination addresses of data for the internal memory bus are defined, the DMA system can transfer data between an internal memory block and an external memory block.

The direct memory access (DMA) method according to an embodiment of the invention is described below. The DMA method is utilized in a DMA system that includes at least one read bus, at least one write bus, and at least one buffer memory bus. The DMA method includes the following steps: utilizing a control table to define the source and the destination addresses of data for a plurality of channels that are electrically connected to the read bus, the write bus, and the buffer memory bus; and transferring data by the DMA system according to the source and the destination addresses of data for each channel, wherein the read bus, the write bus, and the buffer memory bus are accessed simultaneously in one period of time. The detailed steps about data transfer have been described earlier with reference to FIGS. 3 to 5, thus not repeatedly explaining in detail here.

According to the DMA system and method of the invention, since the read bus 32, the write bus 33, and the buffer memory bus 34 are shared by a plurality of peripheral devices, the transmission efficiency is improved and the number of buses can be reduced. Besides, when the bandwidth is required to be increased, the DMA architecture of the invention makes it easy to add more buses thereto and simplifies the connection between peripheral devices and buses. Moreover, the design of transmitting channels is more flexible and has high expandability. Further, under the DMA configuration according to the invention, the buffer memory can be shared by different peripheral devices for temporary storage to thus save memory space and chip areas as a result. Therefore, the allocation of memory space can be centralized to promote the utilization of memories.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A direct memory access (DMA) system, comprising:
at least one read bus having at least a first read port for reading data from a first peripheral device;
at least one write bus having at least a first write port for writing data into a second peripheral device;
at least one buffer memory bus having at least a second read port and at least a second write port for accessing a buffer memory; and
a direct memory access controller, comprising:
a plurality of channels electrically connected between the read bus and the memory bus, connected between the write bus and the memory bus, and connected between the read bus and the write bus, wherein a source address and a destination address of data for each channel are assigned by a control table; and
a bus arbiter for performing bus arbitration and prioritizing data access among the read bus, the write bus, and the buffer memory bus; wherein reading and writing operations for one DMA transaction are executed by different buses.

2. The DMA system according to claim 1, wherein the bus arbiter allows the read bus, the write bus, and the buffer memory bus to be accessed simultaneously in one period of time.

3. The DMA system according to claim 1, wherein the plurality of channels comprises:
a first channel electrically connected to the read bus and the buffer memory bus;
a second channel electrically connected to the buffer memory bus and the write bus; and
a third channel electrically connected to the read bus and the write bus.

4. The DMA system according to claim 1, wherein the source address of data is the first read port or a memory address of the buffer memory, and the destination address of data is the first write port or a memory address of the buffer memory.

5. The DMA system according to claim 1, wherein the control table further records at least one of the enablement status, the data length, and the data transfer state for each channel.

6. The DMA system according to claim 1, wherein each channel comprises a register to temporarily store transmitted data.

7. The DMA system according to claim 1, wherein the control table is implemented by hardware, firmware, software, or a combination of at least two of them.

8. The DMA system according to claim 1, wherein the first and the second peripheral devices are identical.

9. The DMA system according to claim 1, wherein the buffer memory bus comprises:
a memory read bus having the second read port for reading data from the buffer memory; and
a memory write bus having the second write port for writing data into the buffer memory.

10. The DMA system according to claim 1, wherein the buffer memory is a static random access memory.

11. The DMA system according to claim 1, further comprising:
an internal memory bus having a third read port and a third write port for accessing an internal memory of a processor.

12. The DMA system according to claim 1, wherein the source address of data is the first read port, a memory address of the buffer memory, or a memory address of an internal memory.

13. A direct memory access (DMA) method used for a DMA system, the DMA system comprising at least one read bus, at least one write bus, and at least one buffer memory bus, the DMA method comprising the steps of:
utilizing a control table to assign a source address and a destination address of data for each of a plurality of channels of the DMA system, the channels being electrically connected between the read bus and the memory bus, connected between the write bus and the memory bus, and connected between the read bus and the write bus; and transferring data by the DMA system according to the source address and the destination address of data for each channel, wherein the read bus, the write bus, and the buffer memory bus are allowed to be accessed simultaneously in one period of time, and reading and writing operations for one DMA transaction are executed by different buses.

14. The DMA method according to claim 13, wherein the source address of data is a read port of the read bus or a memory address of a buffer memory that is electrically connected to the buffer memory bus.

15. The DMA method according to claim 13, wherein the destination address of data is a write port of the write bus or a memory address of a buffer memory that is electrically connected to the buffer memory bus.

16. The DMA method according to claim 13, wherein the control table further records at least one of the enablement status, the data length, and the data transfer state for each channel.

17. The DMA method according to claim 13, wherein each channel comprises a register to temporarily store transmitted data.

18. The DMA method according to claim 13, wherein the control table is implemented by hardware, firmware, software, or a combination of at least two of them.

19. The DMA method according to claim 13, wherein the source address of data is a read port of the read bus, a memory address of a buffer memory electrically connected to the buffer memory bus, or a memory address of an internal memory.

20. The DMA method according to claim 13, wherein the destination address of data is a write port of the write bus, a memory address of a buffer memory electrically connected to the buffer memory bus, or a memory address of an internal memory.

* * * * *